(12) United States Patent
Tang et al.

(10) Patent No.: US 9,781,547 B2
(45) Date of Patent: Oct. 3, 2017

(54) METHOD FOR ESTABLISHING WLAN BY MOBILE TERMINAL, AND MOBILE TERMINAL

(71) Applicant: ZTE Corporation, Shenzhen (CN)

(72) Inventors: Shaojian Tang, Shenzhen (CN); Qihong Fu, Shenzhen (CN); Wenfeng He, Shenzhen (CN); Yuan Zhu, Shenzhen (CN); Chi Zhang, Shenzhen (CN); Chen Deng, Shenzhen (CN); Ying Li, Shenzhen (CN)

(73) Assignee: XI'AN ZTE NEW SOFTWARE COMPANY LIMITED, Xi'an (CN)

( * ) Notice: Subject to any disclaimer, the term of this patent is extended or adjusted under 35 U.S.C. 154(b) by 0 days.

(21) Appl. No.: 14/913,467

(22) PCT Filed: Nov. 14, 2013

(86) PCT No.: PCT/CN2013/087158
§ 371 (c)(1),
(2) Date: Feb. 22, 2016

(87) PCT Pub. No.: WO2014/169633
PCT Pub. Date: Oct. 23, 2014

(65) Prior Publication Data
US 2016/0212572 A1   Jul. 21, 2016

(30) Foreign Application Priority Data

Aug. 23, 2013   (CN) .......................... 2013 1 0373394

(51) Int. Cl.
*H04W 4/00*   (2009.01)
*H04W 8/00*   (2009.01)
(Continued)

(52) U.S. Cl.
CPC ......... *H04W 4/008* (2013.01); *H04L 61/3005* (2013.01); *H04W 8/005* (2013.01);
(Continued)

(58) Field of Classification Search
CPC ..... H04W 8/005; H04W 84/20; H04W 84/12; H04W 4/008; H04W 48/20; H04L 61/3005; H04L 61/6022; H04L 61/6095
See application file for complete search history.

(56) References Cited

U.S. PATENT DOCUMENTS

2009/0207445 A1* 8/2009 Kimura .............. H04N 1/00307
358/1.15
2014/0206346 A1* 7/2014 Kiukkonen ....... H04W 52/0229
455/426.1

FOREIGN PATENT DOCUMENTS

| CN | 103037533 A | 4/2013 |
|---|---|---|
| CN | 103179635 A | 6/2013 |
| WO | 2007057758 A2 | 5/2007 |

OTHER PUBLICATIONS

International Search Report for corresponding application Application No. PCT/CN2013/087158 filed on Nov. 14, 2013; Mail date May 28, 2014.

* cited by examiner

*Primary Examiner* — Ian N Moore
*Assistant Examiner* — Brian T Le
(74) *Attorney, Agent, or Firm* — Cantor Colburn LLP

(57) ABSTRACT

Provided are a method for establishing a WLAN by a mobile terminal and a mobile terminal. The method comprises: when the mobile terminal needs to establish a WLAN with other terminals, the mobile terminal starts Bluetooth, and modifies a name of a Bluetooth device of the mobile terminal to a character string that contains an identifier; and starts Bluetooth search to acquire Bluetooth MAC addresses
(Continued)

of other terminals with the identifiers contained in the name of the Bluetooth device; and a Bluetooth MAC address of the mobile terminal is compared with the acquired Bluetooth MAC addresses respectively, and when the Bluetooth MAC address of the mobile terminal meets a pre-set condition, setting the mobile terminal as a wireless access point of the WLAN.

12 Claims, 1 Drawing Sheet

(51) Int. Cl.
*H04L 29/12* (2006.01)
*H04W 84/20* (2009.01)
*H04W 84/12* (2009.01)

(52) U.S. Cl.
CPC ...... *H04L 61/6022* (2013.01); *H04L 61/6095* (2013.01); *H04W 84/12* (2013.01); *H04W 84/20* (2013.01)

METHOD FOR ESTABLISHING WLAN BY MOBILE TERMINAL, AND MOBILE TERMINAL

TECHNICAL FIELD

The present disclosure relates to the technical field of mobile communications, and in particular to a method for establishing a Wireless Local Area Network (WLAN) by a mobile terminal, and the mobile terminal.

BACKGROUND

With the popularization of mobile intelligent devices, the need for establishing a WLAN between mobile terminals in a short distance to share files is increasing. In establishing the WLAN between mobile terminals in a short distance, one of the mobile terminals is required to serve as a wireless access point (Access Point, referred to as AP for short), and other mobile terminals join the AP, so that the WLAN is established for communication.

However, in the related art, the establishment of the WLAN among mobile terminals requires a user to have a certain network technologies base, which brings difficulty to the operation of common users; in addition, users of different mobile terminals are required to coordinate and determine, in the process of establishing the WLAN, which side serves as a wireless access point and which side serves as a common request access end, and the operation is quite complex, thereby reducing the interest of a user in establishing a WLAN for files sharing, and being not beneficial to the promotion of applications related to a WLAN of a mobile terminal.

SUMMARY

The embodiments of the present disclosure provide a method for establishing a WLAN by a mobile terminal, and a mobile terminal, so as to more conveniently and quickly establish a WLAN.

The embodiments of the present disclosure provide a method for establishing a WLAN by a mobile terminal, comprising:

when the mobile terminal needs to establish a WLAN with other terminals, starting Bluetooth, and modifying a name of a Bluetooth device of the mobile terminal to a character string that contains an identifier;

starting Bluetooth search to acquire Bluetooth media access control (Media Access Control, referred to as MAC for short) addresses of other terminals with the identifier contained in the name of the Bluetooth device; and comparing a Bluetooth MAC address of the mobile terminal with the acquired Bluetooth MAC addresses respectively, and when the Bluetooth MAC address of the mobile terminal meets a pre-set condition, setting the mobile terminal as a wireless access point of the WLAN.

Preferably, comparing the Bluetooth MAC address of the mobile terminal with the acquired Bluetooth MAC addresses respectively, and when the Bluetooth MAC address of the mobile terminal meets a pre-set condition, setting the mobile terminal as a wireless access point of the WLAN comprises:

performing character string comparison on the Bluetooth MAC address of the mobile terminal and the acquired Bluetooth MAC address, and when a character string of the Bluetooth MAC address of the mobile terminal is the maximum one in all the Bluetooth MAC addresses, setting the mobile terminal as the wireless access point to start a wireless access function, receive and agree with a wireless access request from other terminals with the identifier contained in a name in a Bluetooth device; or performing character string comparison on the Bluetooth MAC address of the mobile terminal and the acquired Bluetooth MAC address, and when a character string of the Bluetooth MAC address of the mobile terminal is the minimum one in all the Bluetooth MAC addresses, setting the mobile terminal as the wireless access point to start a wireless access function, receive and agree with a wireless access request from other terminals with the identifier contained in the name of the Bluetooth device.

Preferably, setting the mobile terminal as the wireless access point of the WLAN when the Bluetooth MAC address of the mobile terminal meets the pre-set condition further comprises:

verifying the wireless access request sent by other terminals with the identifier contained in the name of the Bluetooth device.

Preferably, after comparing the Bluetooth MAC address of the mobile terminal with the acquired Bluetooth MAC addresses respectively, the method further comprises:

when the Bluetooth MAC address of the mobile terminal does not meet the pre-set condition, searching for the wireless access point and sending the wireless access request.

Preferably, starting Bluetooth search to acquire the Bluetooth MAC addresses of other terminals with the identifier contained in the name of the Bluetooth device comprises:

starting the Bluetooth search, setting a search condition as containing the identifier in the name of the Bluetooth device, and acquiring the Bluetooth MAC addresses of other terminals with the identifier contained in the name of the Bluetooth device.

The embodiments of the present disclosure further provide a mobile terminal for establishing a WLAN, wherein the device comprises:

a start and modification component configured to start Bluetooth when the mobile terminal needs to establish a WLAN with other terminals, and modify a name of a Bluetooth device of the mobile terminal to a character string that contains an identifier;

a search and acquisition component configured to start Bluetooth search to acquire Bluetooth MAC addresses of other terminals with the identifier contained in the name of the Bluetooth device; and a comparison and execution component configured to compare a Bluetooth MAC address of the mobile terminal with the acquired Bluetooth MAC addresses respectively, and when the Bluetooth MAC address of the mobile terminal meets a pre-set condition, set the mobile terminal as a wireless access point of the WLAN.

Preferably, the comparison and execution component is configured to:

perform character string comparison on the Bluetooth MAC address of the mobile terminal and the acquired Bluetooth MAC address, and when a character string of the Bluetooth MAC address of the mobile terminal is the maximum one in all the Bluetooth MAC addresses, set the mobile terminal as the wireless access point to start a wireless access function, receive and agree with a wireless access request from other terminals with the identifier contained in the name of the Bluetooth device; or perform character string comparison on the Bluetooth MAC address of the mobile terminal and the acquired Bluetooth MAC address, and when a character string of the Bluetooth MAC address of the mobile terminal is the minimum one in all the Bluetooth MAC addresses, set the mobile terminal as the wireless access point to start a wireless access function, receive and agree with a wireless access request from other terminals with the identifier contained in the name of the Bluetooth device.

Preferably, the comparison and execution component is further configured to:

verify the wireless access request sent by other terminals with the identifier contained in the name of the Bluetooth device.

Preferably, the comparison and execution component is further configured to:

when the Bluetooth MAC address of the mobile terminal does not meet the pre-set condition, search for the wireless access point and send the wireless access request.

Preferably, the search and acquisition component is further configured to:

start the Bluetooth search, set a search condition as containing the identifier in the name of the Bluetooth device, and acquire the Bluetooth MAC addresses of other terminals with the identifier contained in the name of the Bluetooth device.

The method for establishing a WLAN by a mobile terminal, and the mobile terminal are provided by the embodiments of the present disclosure, in which Bluetooth MAC addresses of other terminals intending to establish the WLAN are acquired through Bluetooth search of a mobile terminal according to a character string containing an identifier, and when a character string of a Bluetooth MAC address of the mobile terminal is the maximum or minimum one in all the Bluetooth MAC addresses, the mobile terminal is set as a wireless access point to start a wireless access function to receive a wireless access request of other terminals so as to establish the WLAN; and since a user is not required to coordinate and determine the wireless access point and a common request access end, the quickness and simplicity of establishing the WLAN by the user via the mobile terminal are improved, and sharing files by the user by establishing the WLAN is greatly facilitated.

To make the technical solutions of the present disclosure more clear, the present disclosure is further described in detail hereinafter in conjunction with the drawings.

DETAILED DESCRIPTION OF THE EMBODIMENTS

The solution of the embodiments of the present disclosure is mainly: Bluetooth MAC addresses of other terminals intending to establish a WLAN are acquired through Bluetooth search of a mobile terminal according to a character string containing an identifier, and when a character string of a Bluetooth MAC address of the mobile terminal is the maximum or minimum one in all the Bluetooth MAC addresses, the mobile terminal is set as a wireless access point to start a wireless access function to receive a wireless access request from other terminals so as to establish the WLAN. Since a user is not required to coordinate and determine the wireless access point and a common request access end, the quickness and simplicity of establishing the WLAN by the user via the mobile terminal are improved.

Figure 1:
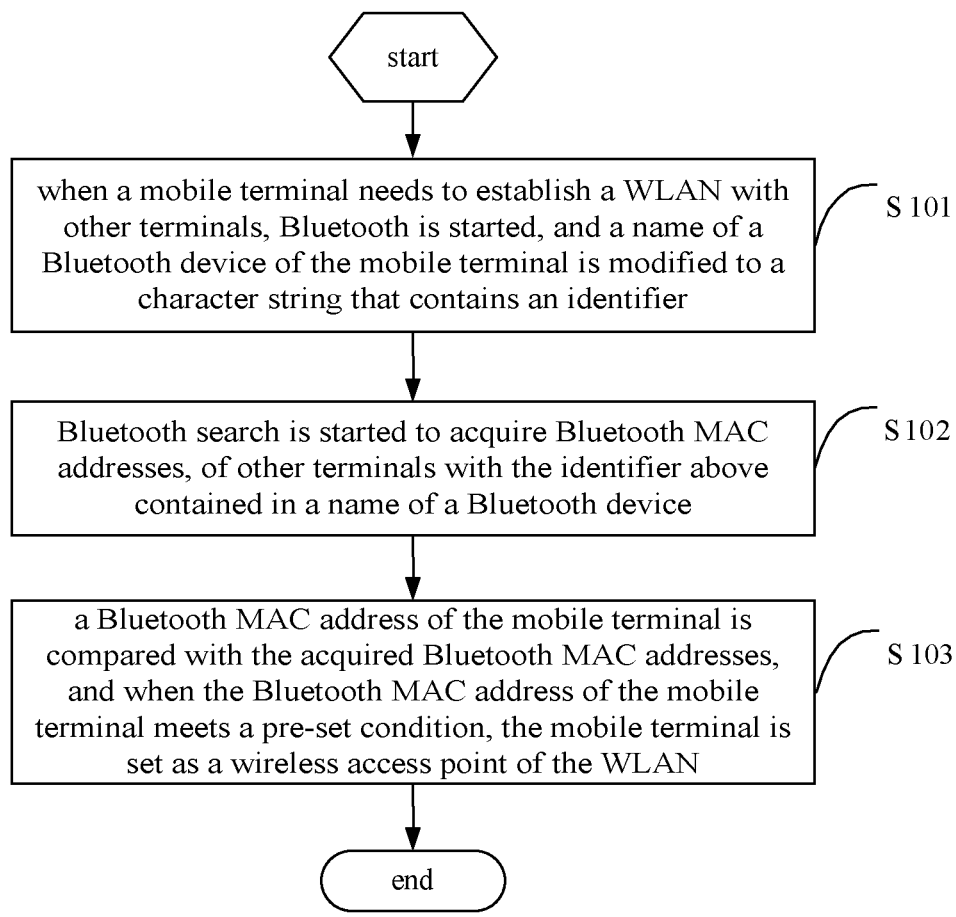
FIG. 1 shows a schematic flowchart of a method for establishing a WLAN by a mobile terminal according to a preferred embodiment of the present disclosure.

As shown in FIG. 1, the preferred embodiment of the present disclosure provides a method for establishing a WLAN by a mobile terminal.

In the step S101, when a mobile terminal needs to establish a WLAN with other terminals, Bluetooth is started, and a name of a Bluetooth device of the mobile terminal is modified to a character string that contains an identifier.

In the present embodiment, the mobile terminal has a Bluetooth function, and when the mobile terminal needs to establish the WLAN with other terminals, Bluetooth is started, and the name of the Bluetooth device thereof is modified to the character string that contains the identifier, wherein the identifier may be a feature field for setting an identification for several terminals that need to establish the WLAN for identification, so that the interference of other unrelated terminals is avoided.

In step S102, Bluetooth search is started to acquire Bluetooth MAC addresses, of other terminals with the identifier above contained in a name of a Bluetooth device.

After modifying the name of the Bluetooth device thereof to the character string that contains the identifier, the mobile terminal uses Bluetooth for search, and sets a search condition as containing the identifier above in the name of the Bluetooth device, so as to ensure that the identified terminals are other terminals needing to establish the WLAN, thereby avoiding wasting time searching other unrelated terminals, and saving the time for search.

After other terminals with the identifier above contained in the name of the Bluetooth device are searched, the Bluetooth MAC addresses of the Bluetooth devices containing the identifier above in the name of the Bluetooth device are acquired and recorded. An MAC address is also called physical address for representing an identifier of each site on the Internet, with a hexadecimal number being adopted, six bytes in total (48-bit). A Bluetooth MAC address of each terminal is unique, and is not the same as that of other terminals, and therefore the acquired and recorded Bluetooth MAC addresses of the Bluetooth devices containing the identifier above in the name of the Bluetooth device and the several terminals needing to establish the WLAN are in one-to-one correspondence.

In Step S103, a Bluetooth MAC address of the mobile terminal is compared with the acquired Bluetooth MAC addresses, and when the Bluetooth MAC address of the mobile terminal meets a pre-set condition, the mobile terminal is set as a wireless access point of the WLAN.

Comparison of a character string size is performed on a Bluetooth MAC address of the mobile terminal and the acquired Bluetooth MAC addresses respectively, and when the comparison is performed, the comparison is begun from a first character in the leftmost of the character string, and if a character size is compared, the comparison is stopped, and the character string with a large character is great; and if the character is the same, the next character continues to be compared in sequence from left to right until the character size is compared, and a character string with a large character is determined to be great.

When the character string of the Bluetooth MAC address of the mobile terminal is the maximum one in all the acquired Bluetooth MAC addresses, the mobile terminal is set as the wireless access point to start its own wireless access function to receive and agree with a wireless access request from other terminals with the identifier above contained in the name of the Bluetooth device, so as to establish the WLAN using the mobile terminal as the wireless access point; and in one optional implementation of the present embodiment, when the character string of the Bluetooth MAC address of the mobile terminal is the minimum one in all the acquired Bluetooth MAC addresses, the mobile terminal may further be set as the wireless access point to start its own wireless access function to receive and agree with a wireless access request of other terminals containing the identifier above in the name of the Bluetooth device, so as to establish the WLAN using the mobile terminal as the wireless access point.

When the Bluetooth MAC address of the mobile terminal does not meet the pre-set condition, that is to say, the character string of the Bluetooth MAC address of the mobile terminal is neither the maximum one in all the acquired Bluetooth MAC addresses nor is it the minimum one in all the acquired Bluetooth MAC addresses, it indicates that the maximum or minimum character string is one of the acquired Bluetooth MAC addresses, a terminal corresponding thereto serving as the wireless access point starts a wireless access function, and then the mobile terminal only needs to search for the wireless access point and sends a wireless access request to the searched wireless access point, i.e. being able to join the established WLAN, which is also quite convenient.

Thereby, only via the Bluetooth on the mobile terminal, a user may determine which side serves as the wireless access point and which side serves as a common request access end in several terminals that need to establish the WLAN, so as to establish the WLAN, which is very convenient and quick.

In one optional implementation of the present embodiment, if the mobile terminal serving as the wireless access point starts its own wireless access function, after receiving the wireless access requests from other terminals with the identifier above contained in the name of the Bluetooth device, the mobile terminal also further verifies the wireless access request above, and after the verification performed by the mobile terminal succeeds, a terminal corresponding to the successfully-verified wireless access request is joined in the established WLAN, such that the mobile terminal serving as the wireless access point needing to establish the WLAN can screen other terminals that request to join the WLAN, which is more flexible, ensures that other terminals joining the WLAN are reliable and verified and agreed by the wireless access point, and improves the security of the WLAN.

Through the above-mentioned solution of the present embodiment, Bluetooth MAC addresses of other terminals intending to establish the WLAN are acquired through Bluetooth search of a mobile terminal according to a character string containing an identifier, and when the character string of the Bluetooth MAC address of the mobile terminal is the maximum or minimum one in all the Bluetooth MAC addresses, the mobile terminal is set as the wireless access point to start a wireless access function to receive a wireless access request from other terminals so as to establish the WLAN; and since a user is not required to coordinate and determine the wireless access point and a common request access end, the quickness and simplicity of establishing the WLAN by the user via the mobile terminal are improved, and sharing files by the user by establishing the WLAN is greatly facilitated.

Figure 2:
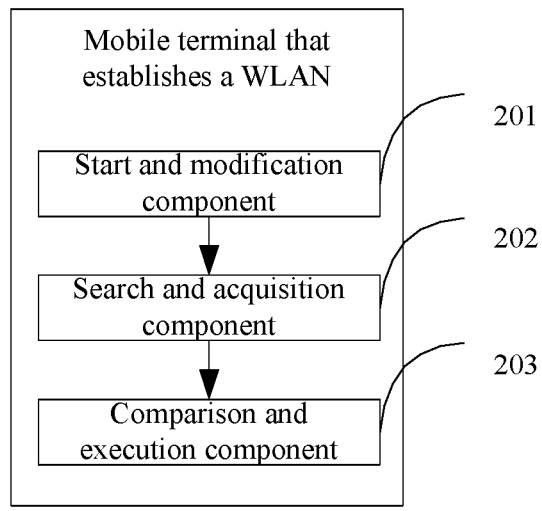
FIG. 2 shows a structural schematic diagram of a mobile terminal for establishing a WLAN in a preferred embodiment of the present disclosure.

As shown in FIG. 2, a preferred embodiment of the present disclosure provides a mobile terminal for establishing a WLAN. The device comprises: a start and modification component 201, a search and acquisition component 202 and a comparison and execution component 203.

The start and modification component 201 is configured to start Bluetooth when the mobile terminal needs to establish a WLAN with other terminals, and modify a name of a Bluetooth device of the mobile terminal to a character string that contains an identifier.

In the present embodiment, the mobile terminal has a Bluetooth function, and when the mobile terminal needs to establish a WLAN with other terminals, Bluetooth is started, and the name of a Bluetooth device thereof is modified to a character string that contains an identifier, wherein the identifier may be a feature field for setting an identification for identifying several terminals that need to establish the WLAN, so that the interference of other unrelated terminals is avoided.

The search and acquisition component 202 is configured to start Bluetooth search to acquire Bluetooth MAC addresses from other terminals with the identifier contained in the name of the Bluetooth device.

After modifying the name of the Bluetooth device thereof to the character string that contains the identifier, the mobile terminal uses Bluetooth for search, and sets a search condition as containing the identifier above in the name of the Bluetooth device, so as to ensure that the identified terminals are other terminals needing to establish the WLAN, thereby avoiding wasting time searching other unrelated terminals, and saving the time for search.

After other terminals with the identifier above contained in the name of the Bluetooth device are found, the Bluetooth MAC addresses of the Bluetooth devices containing the identifier above in the name of the Bluetooth device are acquired and recorded. An MAC address is also called physical address for representing an identifier of each site on the Internet, with a hexadecimal number being adopted, six bytes in total (48-bit). A Bluetooth MAC address of each terminal is unique, and is not the same as that of other terminals, and therefore the acquired and recorded Bluetooth MAC addresses of the Bluetooth device containing the identifier above in the name of the Bluetooth device and the several terminals needing to establish the WLAN are in one-to-one correspondence.

The comparison and execution component 203 is configured to compare a Bluetooth MAC address of the mobile terminal with the acquired Bluetooth MAC addresses respectively, and when the Bluetooth MAC address of the mobile terminal meets a pre-set condition, set the mobile terminal as a wireless access point of the WLAN.

Comparison of a character string size is performed on the Bluetooth MAC address of the mobile terminal and the acquired Bluetooth MAC addresses respectively, and when the comparison is performed, the comparison is begun from a first character in the leftmost of the character string, and if the character size is compared, the comparison is stopped, and the character string with a large character is great; and if the character is the same, the next character continues to be compared in sequence from left to right until the character size is compared, and a character string with a large character is determined to be great.

When the character string of the Bluetooth MAC address of the mobile terminal is the maximum one in all the acquired Bluetooth MAC addresses, the mobile terminal is set as the wireless access point to start its own wireless access function to receive and agree with a wireless access request from other terminals with the identifier above contained in the name of the Bluetooth device, so as to establish the WLAN using the mobile terminal as the wireless access point; and in one optional implementation of the present embodiment, when the character string of the Bluetooth MAC address of the mobile terminal is the minimum one in all the acquired Bluetooth MAC addresses, the mobile terminal may further be set as the wireless access point to start its own wireless access function to receive and agree with a wireless access request from other terminals with the identifier above contained in the name of the Bluetooth device, so as to establish the WLAN using the mobile terminal as the wireless access point.

When the Bluetooth MAC address of the mobile terminal does not meet the pre-set condition, that is, the character string of the Bluetooth MAC address of the mobile terminal is neither the maximum one in all the acquired Bluetooth MAC addresses nor is it the minimum one in all the acquired Bluetooth MAC addresses, it indicates that the maximum or minimum character string is one of the acquired Bluetooth MAC addresses, a terminal corresponding thereto serving as the wireless access point starts a wireless access function, and then the mobile terminal only needs to search for the wireless access point and sends a wireless access request to the found wireless access point, i.e. being able to join the established WLAN, which is also quite convenient.

Thereby, only via the Bluetooth on the mobile terminal, a user may determine which side serves as the wireless access point and which side serves as a common request access end in several terminals that need to establish the WLAN, so as to establish the WLAN, which is very convenient and quick.

In one optional implementation of the present embodiment, if the mobile terminal serving as the wireless access point starts its own wireless access function, after receiving the wireless access request from other terminals with the identifier contained in the name of the Bluetooth device, the mobile terminal also further verifies the wireless access request above, and after the verification performed by the mobile terminal succeeds, a terminal corresponding to the successfully-verified wireless access request is joined in the established WLAN, such that the mobile terminal serving as the wireless access point needing to establish the WLAN can screen other terminals that request to join the WLAN, which is more flexible, ensures that other terminals joining the WLAN are reliable and verified and agreed by the wireless access point, and improves the security of the WLAN.

Through the above-mentioned solution of the present embodiment, since a user is not required to coordinate and determine the wireless access point and a common request access end, the quickness and simplicity of establishing the WLAN by the user via the mobile terminal are improved, and sharing files by the user by establishing the WLAN is greatly facilitated.

The method for establishing a WLAN by a mobile terminal, and the mobile terminal are provided by the present disclosure, in which Bluetooth MAC addresses of other terminals intending to establish the WLAN are acquired through Bluetooth search of a mobile terminal according to a character string containing an identifier, and when the character string of the Bluetooth MAC address of the mobile terminal is the maximum or minimum one in all the Bluetooth MAC addresses, the mobile terminal is set as the wireless access point to start a wireless access function to receive a wireless access request of other terminals so as to establish the WLAN; and since a user is not required to coordinate and determine the wireless access point and a common request access end, the quickness and simplicity of establishing the WLAN by the user via the mobile terminal are improved, and sharing files by the user by establishing the WLAN is greatly facilitated.

It can be clearly understood by persons skilled in the art that, for the purpose of convenient and brief description, only the foregoing division of the functional units and components is taken as an example for illustration, in actual applications, the foregoing functions can be allocated for being completed by different functional units or components according to the needs, i.e. dividing the internal structure of an apparatus into different functional units or components to complete all or some of the foregoing functions. Various functional units and components in the embodiments may be integrated into one processing unit, or each of the units may exist alone physically, or two or more units are integrated into one unit, and the foregoing integrated unit may be implemented in a form of hardware, or may also be implemented in a form of a software function unit. In addition, the specific names of all functional units and components are only intended to distinguish between each other, but are not used to limit the protection scope of the present application. For the specific working process of the units and components in the foregoing apparatus, reference may be made to the corresponding process in the foregoing method embodiments, and details are not described herein again.

The foregoing descriptions are only preferable embodiments of the present disclosure, and the patent scope of the present disclosure is not limited thereto. Any equivalent structure or process variation made by using the content of the description and drawings of the present disclosure, or any direct or indirect application of them in other relevant technical fields, shall all fall within the patent protection scope of the present disclosure

INDUSTRIAL APPLICABILITY

The above-mentioned technical solution provided by the present disclosure may be applied to the process of establishing a WLAN, in which the technical solution that Bluetooth MAC addresses of other terminals intending to establish the WLAN is acquired by using a character string containing an identifier through Bluetooth search of a mobile terminal, and when a character string of a Bluetooth MAC address of the mobile terminal is the maximum or minimum one in all the Bluetooth MAC addresses, the mobile terminal is set as a wireless access point to start a wireless access function is adopted to receive a wireless access request from other terminals so as to establish the WLAN, thereby improving the quickness and simplicity of establishing a WLAN by a user via a mobile terminal, and greatly facilitating a user to share files by establishing a WLAN.

What is claimed is:

1. A method for establishing a Wireless Local Area Network (WLAN) by a mobile terminal, comprising:
    when the mobile terminal needs to establish the WLAN with other terminals, starting a Bluetooth device in the mobile terminal, and modifying a name of the Bluetooth device in the mobile terminal to a character string that contains an identifier;
    starting Bluetooth search, to acquire Bluetooth Media Access Control (MAC) addresses of the other terminals with the identifier contained in a name of a Bluetooth device in each of the other terminals; and
    comparing a Bluetooth MAC address of the mobile terminal with the acquired Bluetooth MAC addresses respectively, and when the Bluetooth MAC address of the mobile terminal meets a pre-set condition, setting the mobile terminal as a wireless access point of the WLAN.

2. The method according to claim 1, wherein comparing the Bluetooth MAC address of the mobile terminal with the acquired Bluetooth MAC addresses respectively, and when the Bluetooth MAC address of the mobile terminal meets the pre-set condition, setting the mobile terminal as the wireless access point of the WLAN comprises:

performing character string comparison on the Bluetooth MAC address of the mobile terminal and the acquired Bluetooth MAC addresses respectively, and when a character string of the Bluetooth MAC address of the mobile terminal is a maximum one of the Bluetooth MAC address of the mobile terminal and the acquired Bluetooth MAC addresses, setting the mobile terminal as the wireless access point to start a wireless access function, receive and agree with a wireless access request from the other terminals with the identifier contained in the name of the Bluetooth device; or performing character string comparison on the Bluetooth MAC address of the mobile terminal and the acquired Bluetooth MAC address, and when the character string of the Bluetooth MAC address of the mobile terminal is a minimum one of the Bluetooth MAC address of the mobile terminal and the acquired Bluetooth MAC addresses, setting the mobile terminal as the wireless access point to start the wireless access function, receive and agree with the wireless access request of the other terminals with the identifier contained in the name of the Bluetooth device.

3. The method according to claim 2, wherein setting, when the Bluetooth MAC address of the mobile terminal meets the pre-set condition, the mobile terminal as the wireless access point of the WLAN further comprises:

verifying the wireless access request sent by the other terminals with the identifier contained in the name of the Bluetooth device.

4. The method according to claim 1, wherein after the Bluetooth MAC address of the mobile terminal is compared with the acquired Bluetooth MAC addresses respectively, the method further comprises:

when the Bluetooth MAC address of the mobile terminal does not meet the pre-set condition, searching for the wireless access point and sending the wireless access request.

5. The method according to claim 1, wherein starting the Bluetooth search to acquire the Bluetooth MAC addresses of other terminals with the identifier contained in the name of the Bluetooth device comprises:

starting the Bluetooth search, setting a search condition as containing the identifier in the name of the Bluetooth device, and acquiring the Bluetooth MAC addresses of the other terminals with the identifier contained in the name of the Bluetooth device.

6. A mobile terminal for establishing a Wireless Local Area Network, comprising:

a start and modification component configured to, when the mobile terminal needs to establish the WLAN with other terminals, start a Bluetooth device in the mobile terminal, and modify a name of the Bluetooth device of the mobile terminal to a character string that contains an identifier;

a search and acquisition component configured to start Bluetooth search, to acquire Bluetooth media access control (MAC) addresses of the other terminals with the identifier contained in a name of a Bluetooth device in each of the other terminals; and a comparison and execution component configured to compare a Bluetooth MAC address of the mobile terminal with the acquired Bluetooth MAC addresses respectively, and when the Bluetooth MAC address of the mobile terminal meets a pre-set condition, set the mobile terminal as a wireless access point of the WLAN.

7. The mobile terminal according to claim 6, wherein the comparison and execution component is configured to:

perform character string comparison on the Bluetooth MAC address of the mobile terminal and the acquired Bluetooth MAC addresses respectively, and when a character string of the Bluetooth MAC address of the mobile terminal is a maximum one of the Bluetooth MAC address of the mobile terminal and the acquired Bluetooth MAC addresses, set the mobile terminal as the wireless access point to start a wireless access function, receive and agree with a wireless access request from the other terminals with the identifier contained in a name of a Bluetooth device; or perform character string comparison on the Bluetooth MAC address of the mobile terminal and the acquired Bluetooth MAC addresses respectively, and when a character string of the Bluetooth MAC address of the mobile terminal is a minimum one of the Bluetooth MAC address of the mobile terminal and the acquired Bluetooth MAC addresses, set the mobile terminal as the wireless access point to start the wireless access function, receive and agree with the wireless access request from the other terminals with the identifier contained in the name of the Bluetooth device.

8. The mobile terminal according to claim 7, wherein the comparison and execution component is further configured to:

verify the wireless access request sent by the other terminals with the identifier contained in the name of the Bluetooth device.

9. The mobile terminal according to claim 6, wherein the comparison and execution component is further configured to:

when the Bluetooth MAC address of the mobile terminal does not meet the pre-set condition, search for the wireless access point and send the wireless access request.

10. The mobile terminal according to claim 6, wherein the search and acquisition component is further configured to:

start the Bluetooth search, set a search condition as containing the identifier in the name of the Bluetooth device, and acquire the Bluetooth MAC addresses of the other terminals with the identifier contained in the name of the Bluetooth device.

11. The method according to claim 2, wherein after the Bluetooth MAC address of the mobile terminal is compared with the acquired Bluetooth MAC addresses respectively, the method further comprises:

when the Bluetooth MAC address of the mobile terminal does not meet the pre-set condition, searching for the wireless access point and sending the wireless access request.

12. The mobile terminal according to claim 7, wherein the comparison and execution component is further configured to:

when the Bluetooth MAC address of the mobile terminal does not meet the pre-set condition, search for the wireless access point and send the wireless access request.

\* \* \* \* \*